United States Patent
Frommann et al.

(10) Patent No.: US 9,506,236 B2
(45) Date of Patent: Nov. 29, 2016

(54) DEVICE AND PROCESS FOR REMOVING FLOATING MATERIAL FROM A LIQUID

(75) Inventors: Christian Frommann, Neumarkt (DE); Franz Spenger, Röttenbach (DE); Stefan Reber, Nürnberg (DE)

(73) Assignee: Huber SE, Berching (DE)

( * ) Notice: Subject to any disclaimer, the term of this patent is extended or adjusted under 35 U.S.C. 154(b) by 289 days.

(21) Appl. No.: 13/190,924

(22) Filed: Jul. 26, 2011

(65) Prior Publication Data

US 2012/0018368 A1 Jan. 26, 2012

(30) Foreign Application Priority Data

Jul. 26, 2010 (DE) .......................... 10 2010 038 417

(51) Int. Cl.

| | |
|---|---|
| B01D 21/00 | (2006.01) |
| B01D 21/24 | (2006.01) |
| B01D 24/28 | (2006.01) |
| E03F 5/14 | (2006.01) |
| B01D 29/88 | (2006.01) |
| B01D 29/92 | (2006.01) |
| B01D 29/70 | (2006.01) |

(Continued)

(52) U.S. Cl.
CPC ................. *E03F 5/14* (2013.01); *B01D 29/88* (2013.01); *B01D 29/70* (2013.01); *B01D 29/925* (2013.01); *B01D 33/0009* (2013.01); *B01D 33/0064* (2013.01); *B01D 33/0077* (2013.01); *B01D 33/073* (2013.01)

(58) Field of Classification Search
CPC ....................................................... E03F 5/14
See application file for complete search history.

(56) References Cited

U.S. PATENT DOCUMENTS 3,640,395 A * 2/1972 Kinney .......................... 210/334
3,707,070 A * 12/1972 Chaplin .............................. 56/1

(Continued)

FOREIGN PATENT DOCUMENTS

| | | |
|---|---|---|
| DE | 34 20 157 C1 | 1/1986 |
| DE | 41 36 401 A1 | 1/1993 |
| DE | 195 14 596 A1 | 10/1996 |

OTHER PUBLICATIONS

German Patent Office Search Report, Oct. 25, 2010.

(Continued)

*Primary Examiner* — Nam Nguyen
*Assistant Examiner* — Richard Gurtowski
(74) *Attorney, Agent, or Firm* — Dority & Manning, P.A.

(57) ABSTRACT

A device for removing floating material from a liquid, especially from sewage, has at least one sieve element shaped like a filter basket, for example, that in a front side has an inlet opening through which liquid can flow into the interior of the sieve element. The device is equipped with a drive so the sieve element can rotate around a rotation axis. A collection device is arranged within the sieve element for collecting the liquid and/or floating material, in which case the collection device is attached to a pumping-out device for the liquid and/or the floating material. A process for removing floating material from a liquid, especially from sewage, uses a sieve device that contains at least one sieve element that may be shaped like a filter basket, for example, and is equipped with a drive so it can rotate around a rotating axis. Liquid and/or floating material is collected with the help of a collection device arranged within the sieve element for subsequent withdrawal from the collecting device with a pumping-out device.

18 Claims, 6 Drawing Sheets

(51) Int. Cl.
  *B01D 33/00* (2006.01)
  *B01D 33/073* (2006.01)

(56) References Cited

U.S. PATENT DOCUMENTS

| | | | | |
|---|---|---|---|---|
| 4,385,703 | A | * | 5/1983 | Murphy, II .................. 209/674 |
| 4,859,322 | A | | 8/1989 | Huber |
| 4,952,314 | A | * | 8/1990 | Henricson et al. ........... 210/404 |
| 5,141,166 | A | * | 8/1992 | Maynard, Jr. ............ 241/46.015 |
| 5,296,098 | A | * | 3/1994 | Fjallstrom ...................... 162/55 |
| 5,921,675 | A | * | 7/1999 | Zikeli et al. .................. 366/186 |
| 6,015,490 | A | | 1/2000 | Katsukura et al. |
| 6,103,110 | A | * | 8/2000 | Frommann et al. .......... 210/159 |
| 6,161,305 | A | * | 12/2000 | Maier et al. ..................... 34/315 |
| 2002/0134796 | A1 | * | 9/2002 | Nussbaumer .......... B65D 88/66 222/200 |
| 2005/0217350 | A1 | * | 10/2005 | Jabusch et al. .............. 73/64.55 |
| 2005/0247610 | A1 | | 11/2005 | Frommann |

OTHER PUBLICATIONS

EP Extended Search Report, Nov. 9, 2011.

\* cited by examiner

DEVICE AND PROCESS FOR REMOVING FLOATING MATERIAL FROM A LIQUID

FIELD OF THE INVENTION

This disclosure refers to a device for removing floating material from a liquid, especially from sewage, with at least one sieve element shaped like a filter basket, for example, that in a frontal side area has an inlet opening through which the liquid can flow into the interior of the sieve element, and with a drive so the sieve element can be rotated around a rotating axis.

Furthermore, a process is disclosed for removing floating material from a liquid, especially from sewage, with a sieve device that has at least one sieve element shaped like a filter basket, for example, and equipped with a drive so it can rotate around a rotating axis.

BACKGROUND

A device of the type described above is known from DE 34 20 157 C1, which has a sieve grate shaped like a cylinder jacket set obliquely with its axis in a channel while the grate is hydraulically open on the inlet side and largely hydraulically closed on the outlet side. The sieve grate has a slot-hole perforation that forms a deposit area in the inner side, while the liquid passes through the slot, remaining in the channel. The sieve grate is rotationally driven with a screw conveyor that starts in a collecting funnel, which is coaxially fixed in place and seated in the channel area. Above the collecting funnel, on the outside of the grate, a stationary arranged separating device shaped like a brush roller or a spray water bar has been provided to separate from the exterior the floating material that is on the inner side of the sieve grate. The floating material finally falls into the collecting funnel on which the screw conveyor begins and is transported away to a discharge station located away from the liquid.

Similar working filters are used in the shape of so-called drum filters, driven mostly around a horizontal rotating axis. They find an application in the most varied industrial sectors, such as in sewage water treatment, paper manufacturing or also in the food industry.

Whereas the mentioned filters are ideally suited for removing larger and heavier impurities from a fluid, when there are very fine or slight impurities there are frequently problems during the removal of the floating substances from the sieve devices, as they cannot be captured well enough by the discharge device or they refloat in this area, thus making their discharge a lot harder.

It is therefore a task of this invention to suggest a device and a process for removing floating substances of the most varied size and mass from a liquid but nonetheless retain the advantages of conventional rotation filters.

SUMMARY

Additional objects and advantages of the invention will be set forth in part in the following description, or may be obvious from the description, or may be learned through practice of the invention.

Regarding the present device, a collection device for collecting liquid and/or floating material is placed inside the sieve element with a device for pumping out the liquid and/or floating material. Whereas in the filter devices described above, generally screw conveyors (whose conveying capacity especially depends on the floating material composition) are exclusively used. The collection device according to certain embodiments of the invention is capable of catching even the smallest particles that detach from the filter area after the filtering process and finally removing them with the help of the pumping-out device. In this case, the collection device is advantageously arranged in the central area of the sieve element so that the floating substances falling off the sieve area can drop into the collection device. Apart from the floating material, the collection device can also collect a corresponding liquid that either adheres to the floating material or also drips downwards from the upper area of the generally horizontally or obliquely arranged sieve area. If this liquid is collected, it has the advantage that the collected floating substances form a suspension together with the liquid and both can subsequently be pumped out together. Thus, in this case the collection device used with the pumping-out device takes the function of a conventionally used discharging screw, but is also capable of discharging especially fine floating substances. Finally, the collection device prevents the floating materials that were already filtered out from falling back to the untreated liquid, thus making it possible to reliably remove the individual floating substances.

It is advantageous for the collection device within the sieve element to have a feeding area shaped, for example, like a collecting funnel for the floating material and/or the liquid. This arrangement ensures that the floating material falling or the liquid dripping while the filter area rotates is securely collected and can be led to the collection device, which in this case is located preferably in the central area of the filter element, particularly in the area of the rotation axis. If the feeding area has been executed as a collecting funnel, it has the decisive advantage that all floating substances falling through wiping elements (e.g. liquid or air nozzles, brush elements or scrapers) or from the sieve area owing to the gravitational pull while the sieve element turns around a horizontal axis or an inclined one for this purpose, can be securely collected. The floating substances and the dripping liquid adhering to the floating substances or the sieve area reliably reaches the collection device in this way via the feeding area, from where they can then be pumped out from it. Generally, the sieve area can consist of a perforated and/or slotted sheet. Fine-meshed sieves made of woven fabric that are preferably installed on a corresponding support structure like an arm drum for support are also conceivable. Likewise, the material can be correspondingly adapted to the sieve area and include metal, many different plastics and/or natural media as well.

It is furthermore advantageous if the side wall of the collection device is executed in liquid-tight fashion with respect to the sieve element's interior, except in the feeding area. This is especially advantageous if the sieve element is at least partially immersed into the liquid to be filtered. This is the case in the respective sieve devices arranged horizontally or also obliquely within a flowing liquid such as sewage, for example. If the side wall area of the collection device would now be perforated, then untreated liquid would flow inside and the already separated floating substances would be diluted, something that is not desired. If necessary, it is also possible to additionally raise one of the lateral walls of the collection device—an advantage particularly in inclined sieve elements because in this case most of the time the collection device is likewise obliquely arranged too. If at least the flow-facing section and the corresponding adjacent lateral area of the collection device are now raised, this ensures that all wall sections of the collection device protrude above the liquid level of the liquid flowing into the filter element.

It is also advantageous for the collection device to be shaped like a trough. Especially in this case, the collection device is arranged in the central area of the sieve element, thus forming a kind of catch basin, eventually reached by the filtered-out floating substances or deposited liquid.

It is also advantageous for the collection device to extend essentially over the entire length or at least a part of the feeding area in order to catch a large volume on the one hand and to ensure on the other hand that at least most of the liquid dripping from the sieve element is securely collected or, depending on the device's construction, that the falling floating substances can also be collected. In this context, it is also advantageous if the floating substances are not collected with the correspondingly adhering liquid or with liquid extracted in another way, but solely with liquid from the collection device and then pumped out. In this case, one separation of liquid and filtered-out floating substances is necessary (described in more detail below), so that finally only the liquid can get to the collection device.

For the necessary separation of liquid and floating substances, it can for example be advantageous if the device according to the invention would have a discharge device for the floating materials, arranged at least partially within the sieve element and preferably shaped like a screw conveyor. In this case, an additional filter element advantageously separates the discharge device from the collection device, so that the floating substances discharged by the rotation of the actual filter element and the liquid transported with it can be reliably separated as much as possible before the discharging device. The liquid finally reaches the collection device, from which it is removed with the help of the pumping-out device, while the discharge device carries out the floating substances.

It is also extremely advantageous for the feeding area to have at least one perforated wall section arranged above the collection device. The floating substances adhering to the sieve element that are later detached from the upper area of the sieve element, or fall down on their own by the action of gravity, reach in this case the feeding area first and hereby the area of the perforated wall section, which acts as an additional filter element. In this area, there is a further separation of floating substances from the liquid adhering to them or the liquid discharged by the rotating sieve element. Whereas the floating substances can now be carried out by the discharge device, which is generally shaped like a screw conveyor, the separated liquid reaches the collection device and can finally be pumped out, possibly in connection with the correspondingly fine floating substances that could not be kept back by the perforated wall section. The result is first an initial separation of floating substances and liquid with the help of the actual rotating sieve element, followed by an additional separation of the floating substances from the carried liquid and possibly also of the finest impurities that are finally pumped up together with the liquid.

In this context, another decisive advantage of the collection device becomes apparent. Since it is generally placed below the discharge device, it easily prevents liquid from reaching the discharge device from below and causing the floating substances to be suspended. Thus, in known conventional devices, screw conveyors generally have a limiting area that opens downwards towards which the screw conveyor's outer edges are guided. As a result of this, floating material is transported towards the conveyor. This limiting area, however, is always executed with perforations, so that liquid adhering to the floating material can drain downwards and not be discharged by the screw conveyor. However, liquid can flow through these perforated limiting areas—at least in the bottom area of a drum filter obliquely immersed in the liquid to be filtered—from the bottom to the top and into the discharge device depending on liquid level, and the expected success thus fails to materialize. Rather, floating material becomes suspended in this area, thus making a discharge very difficult or even impossible when the sieve element is immersed too deeply into the liquid. If, according to the invention, however, one arranges below the discharge device a collection device that is executed in a liquid-tight manner so no liquid to be filtered can penetrate it except for a feeding area pointing upward, then an additional penetration of liquid into the discharge device is prevented. The liquid flowing back into the untreated liquid normally through the limiting area described above is collected in this case by the collection device arranged below and subsequently discharged. The sieve element can now be immersed much deeper into the liquid to be treated than conventional sieves of the sort. Consequently, such a filtering device offers a significantly higher filtering area and therefore also boasts a higher filtering performance. Naturally, it should be pointed out that the respective side walls of the collection device are measured and aligned in a way to prevent the already mentioned undesired penetration of liquid from below.

It is likewise advantageous if the perforated wall section is executed as a joint side wall of the feeding area and the collection device. In this case, the latter has a closed collection volume limited towards the top by the perforated wall section. If now the floating material that was kept back falls off the inner area of the rotating element, it will land on the wall section of the collection device and dissolving liquid will accumulate in the collection device located below. The floating material kept back by the wall section can finally be removed by a discharge device from the filtering device, and in this case the discharge device comprises preferably a screw conveyor whose outer edges are led at least partially along the wall section while the conveyor turns. The wall section thus serves, on the one hand, as wall section of the collection device and, on the other hand, as opposite area of the screw conveyor, on which the floating substances are transported along towards the exterior.

It is especially advantageous if the perforated wall section of the feeding area has a mesh that is smaller than or equal to the mesh of the sieve element because this ensures that no floating substances from the sieve device will be removed through the collection device that should really be kept back from the sieve area of the rotating sieve element. This is particularly advantageous when the liquid collected with the help of the collection device is fed to the liquid that passes through the sieve element (such as is the case, for example, with rotation filters placed in sewage drains in which filtered liquid should not or cannot be removed from the drain, but rather be fed back to the channel, regarding the flow direction towards the filtering device).

It is also advantageous for the collection device and/or feeding area to have at least one detachably arranged wall section so the interior of the collection device can be maintained and repaired. This is particularly important when the pumping device itself is placed inside the collection device. Additional filters or also other mechanical structural components that must be regularly checked can also be inside the collection device.

It is furthermore advantageous for the pumping-out device to have at least one discharge duct extending into the collection device or being connected to it through an opening, in which case the pumping-out device is preferably arranged outside of the collection device. This arrangement allows the pumping-out device to be accessed for maintenance and repair work, while a low-maintenance or maintenance-free pipe section extends merely into the interior of the collection device.

It is especially beneficial if the pumping-out device is operatively connected to a level sensor that detects the liquid level inside the collection device, particularly by connecting to it a control unit in series. In this case, the pumping-out device will only be operated when a certain maximum level is reached inside the collection device in order to minimize energy consumption. Alternatively or also additionally, the filtering device can also be equipped with a corresponding control that triggers a chronological emptying of the collection device. Likewise, remote control devices can also be installed for carrying out the discharge procedure from afar.

It is especially advantageous for the sieve element and/or the collection device to be obliquely arranged with respect to horizontal so the sieve device can be placed in streaming liquids and therefore inside a sewage drain, for example. If the collection device has been built, as described above, in a manner impervious to liquids with the exception of a feeding area, the actual filter element can be immersed deeper into the liquid than the filter elements of conventional installations because an undesired suspension of the floating material in the area of the discharge device is prevented.

Finally, the process according to the invention for removing floating material from a liquid is characterized by the fact that liquid and/or floating material is collected with the help of a collection device arranged within the sieve element and subsequently taken out from the collection device with a pumping-out device. The collection device can ensure in a simple way that the finest liquid-floating material suspensions that cannot be captured with the help of conventional discharge devices like screw conveyors, for instance, can be carried out of the filtration plant. The process can likewise be applied in the filtering of coarser floating material from a liquid in which the screw conveyors mentioned earlier can be used, for example. In such filtration plants, the floating material, which dissolves in the upper part of the rotating sieve element, is captured together with the correspondingly carried liquid, generally in the area of the discharge device. In this area, the discharge device has most of the time an appropriately perforated collecting area that should allow a dripping of the liquid before the floating substances are transported out with the help of the discharge device. The disadvantage of this is that the liquid can also flow from the bottom to the top through the perforations and therefore into the area of the discharge device when the sieve element is immersed too much into the liquid to be treated or the liquid level rises. This causes the floating material to become suspended and it can no longer be reliably discharged. Since according to an aspect of the invention the liquid dripping from the rotating sieve element is collected by a collection device and subsequently drawn off, it is no longer necessary for this liquid to be able to drip back into the liquid to be treated. Rather, the collection device that, with the exception of a feeding area, is preferably executed in a liquid-tight manner, is arranged below the discharge device, and also seals it from the still untreated liquid that surrounds it. In the end, the filtering element can be immersed deeper into the liquid than in conventional installations, resulting in a larger, more efficient filtering area and therefore also in a higher filtering performance with the same size.

It is also extremely advantageous if the collected liquid and/or floating material can be withdrawn continuously or in batches out of the collection device. Whereas a batch-wise withdrawal generally requires a higher degree of control for a maximized operation of the installation, minimal energy consumption can be achieved through this. To simplify the installation even more and have lower manufacturing costs as well, another embodiment of the invention allows coupling the drive of the pumping-out device with the drive of the sieve element with the respective belts, chains or cog wheels.

There are special advantages when, depending on how long the sieve device has been operating and/or the level that the liquid or floating material has reached, the collected liquid and/or floating material can be extracted from within the collection device. Whereas time-dependent withdrawal makes sense, especially in plants uniformly supplied with liquid to be treated, a level-dependent control inside the collection device is possible in all applications and generally the most energy efficient too. Here, it is easiest to monitor the liquid level with a float but the corresponding sensors that detect the level without touching it can also be used.

It is furthermore advantageous for the withdrawn liquid to be fed again to the sieve device in case the withdrawn liquid contains floating material that should really be kept back from the sieve area of the rotating sieve element. In this way, the contamination of the permeate is prevented and a reliable cleaning of the liquid to be purified is ensured.

It is alternatively advantageous to supply the withdrawn liquid that has passed through the sieve element. This procedure is practical, for example, when a corresponding wall design of the collection device or the arrangement of other intermediate filters placed between the collection device and the filter element ensures that only those floating substances can reach the collection device that can also pass through the sieve area of the sieve element. Since the liquid that reaches the collection device has no sieve substances of any kind that are not allowed to reach the permeate, this liquid can mix with the permeate without causing any problems.

BRIEF DESCRIPTION OF THE DRAWINGS

Additional advantages of the invention are described with the help of the embodiment examples below, which show.

DESCRIPTION

Figure 1:
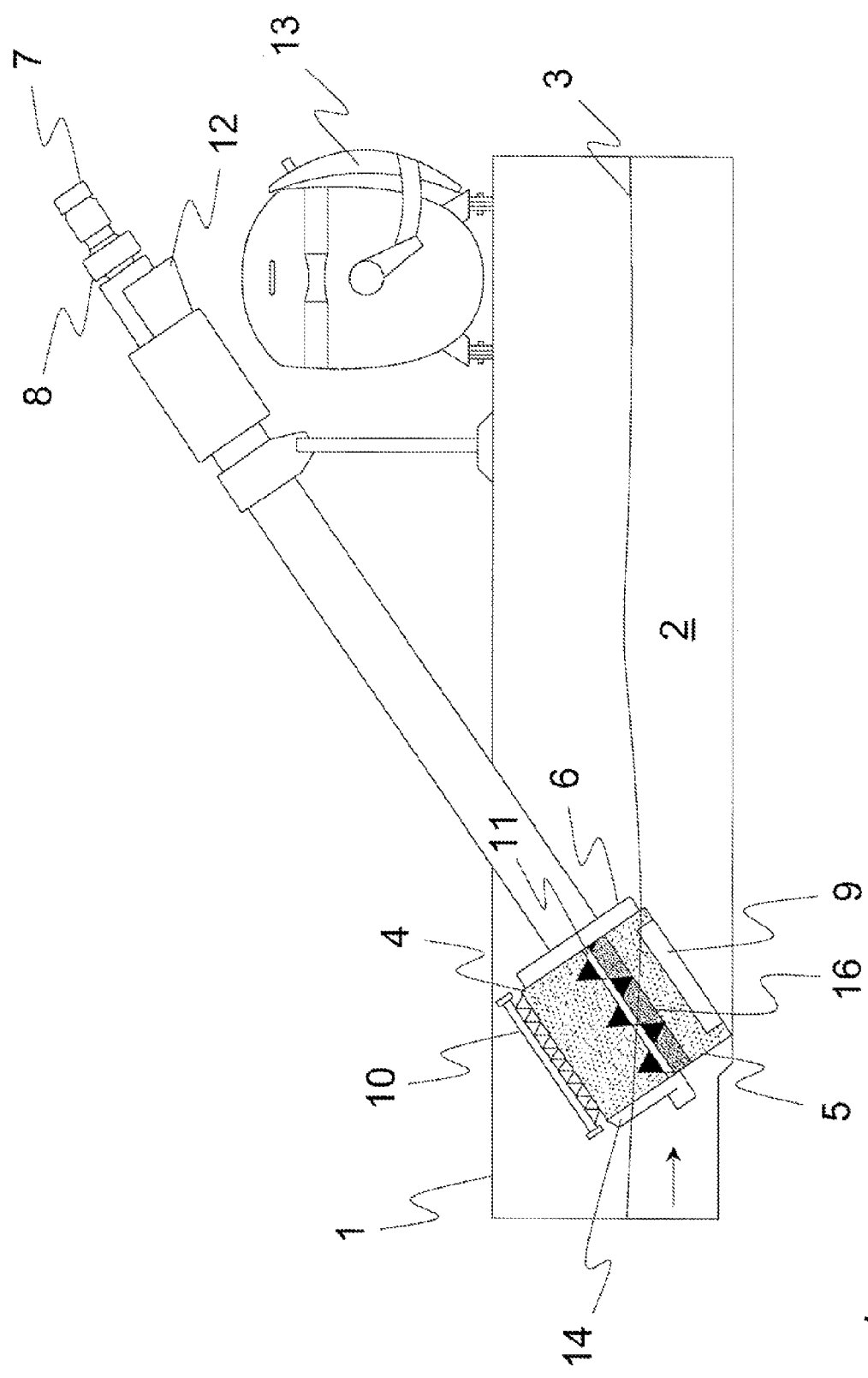
FIG. 1 a lateral view of a sieve device in accordance with the state of the art, FIG. 2 a front view of the filter basket of the sieve device in accordance with FIG. 1 along line A-A, FIG. 3 a cut of the filter basket of a sieve device according to the invention, FIG. 4 a front view of a filter basket of a sieve device according to the invention, FIG. 5 a perspective view of the interior of a filter basket of a sieve device according to the invention, and FIG. 6 a further lateral view of a filter basket of a sieve device according to the invention.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 shows a part of a channel 1, in which the sewage 2 contaminated with floating material flows in the direction of the arrow with a mostly varying water level 3. The sieve device arranged therein has been built into the channel 1 with its obliquely positioned axis and preferably extends all the way to the bottom of the channel 1, in which case there can be a corresponding seal (not shown) between channel 1 and the device so that the dirty sewage 2 cannot pass unfiltered through the device.

The device itself comprises a sieve element with the shape of a cylinder jacket in the form of a filter basket 4 (partly cut in FIG. 1 so one can see its interior) whose filtering area can consist of a perforated or slotted sheet, for example, or of a woven fabric mesh preferably supported by a carrier basket.

On the inlet side, the filter basket 4 has an open front side 5 through which the dirty sewage 2 can flow into the interior of the filter basket 4. On the outlet side, a correspondingly sealed and as a result of it, hydraulically closed front side 6 is provided.

During filtration, the filter basket 4 is set into a rotating motion with the help of a motor 7 and advantageously via a gear 8. The floating material is held back by the filtering area and the rotating movement sooner or later moves it towards the top, in which case the filter basket 4 can have the respective carrier bars 9 for supporting the transportation of the floating material.

Finally, a spraying nozzle bar 10 is arranged in the upper area for detaching the adhering floating material so that it falls into the area of a collection device in form of a screw conveyor 11 (naturally, instead of the spraying nozzle bar 10, air nozzles, scrapers or brush elements can be arranged there).

The screw conveyor 11 reaches finally into the area of a discharge point 12 in the upper section of the sieve device, so that the floating material can be transported upward and be subsequently disposed of in the corresponding container 13. Along the transportation line, the screw conveyor 11 can have a diminishing screw height to additionally compress the floating material within the upper conveying section.

In order to finally make the filter basket 4 rotate, the screw conveyor 11 is rotatably arranged in the area of the front sides 5, 6 and sealed off towards the unmoving parts. Generally, the driving is discontinuous, so that standstill times alternate with rotating times. For transferring the rotational movement of the motor 7 to the filter basket 4, a driving arm 14 located in the lower end of the worm shaft has been provided for connecting the worm shaft and filter basket 4 to one another.

Figure 2:
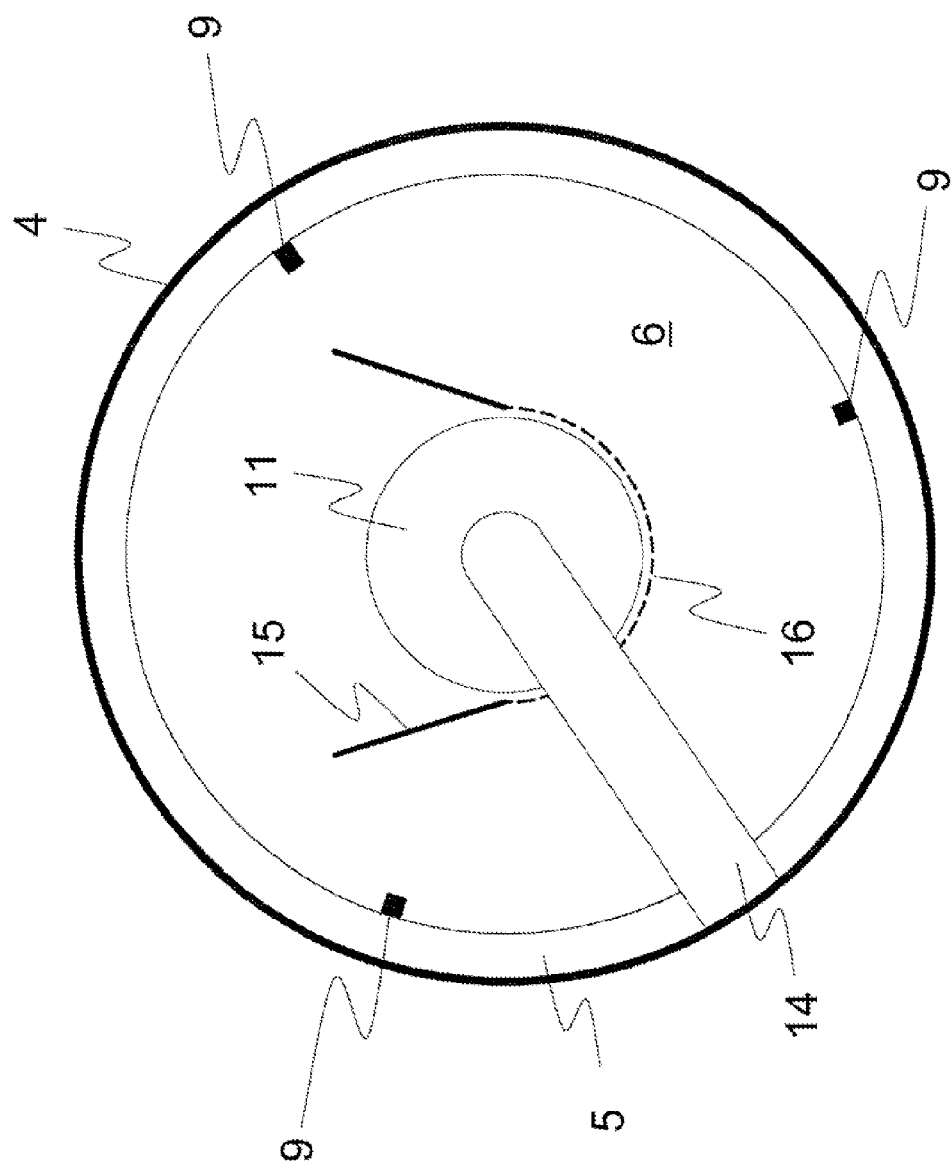

Generally, however, large quantities of liquid are transported upwards through the filter basket 4 together with the floating material, finally falling from above to the screw conveyor 11, in which case the latter has a feeding area shaped like a collecting funnel 15 (clearly shown in FIG. 2 but not in FIG. 1). To ensure that this liquid and the liquid that was pressed out of the floating material while it was transported towards the container 13 can also leave the conveying direction again, the conveying area arranged below the screw conveyor 11 has been designed with perforations. The liquid can drain off at any time through the respective openings 16, so that the floating material is not suspended, at least above the water level 3. This is important, as refloating material cannot be reliably captured by the screw conveyor 11 and transported off accordingly. Below the water level 3, however, such a refloating cannot be prevented, as the openings 16 cause the liquid level to rise above the level of the dirty sewage 2 also inside the screw conveyor 11.

Figure 3:
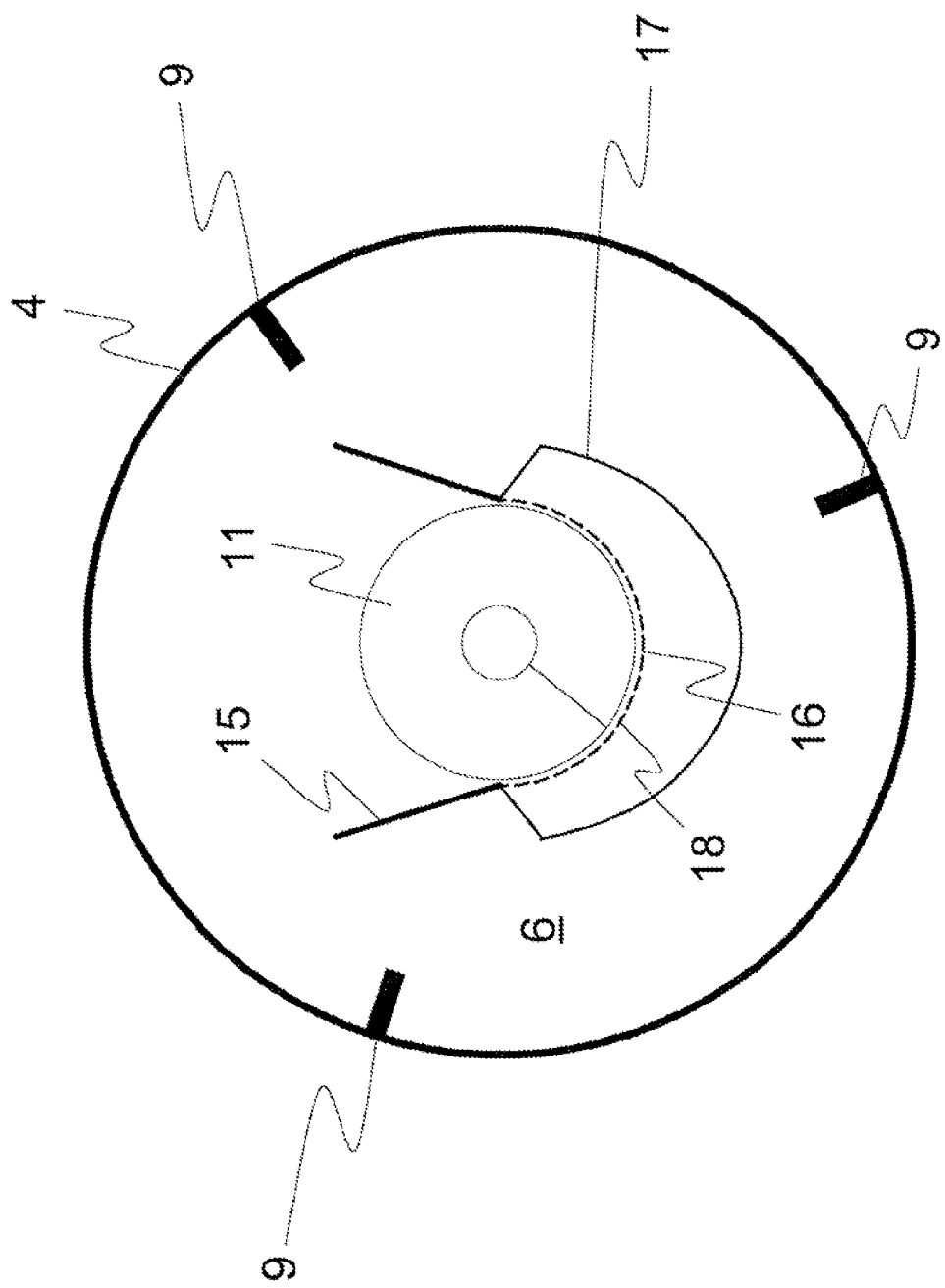

To solve this problem, the invention suggests placing within the sieve element, which in this example has been executed as a filter basket 4, a collection device 17 so the liquid streaming through the openings 16 can be collected (see FIG. 3). Now, during the filtration, the floating material and the liquid adhering to it fall from the top through the collecting funnel 15 into the area of the screw conveyor 11, as is also the case with the installation according to FIG. 1. In this area, the liquid and floating material are separated further, whereby liquid is also released through the compacting of the floating material by the screw conveyor 11 and flows downwards to the area of the collecting funnel 15. However, now the liquid does not flow back any longer to the sewage channel; rather it is collected with the help of the trough-shaped collection device 17, which for this purpose all its sides have been executed in a liquid-tight manner way except for the upper wall section 18 that has openings 16.

Figure 4:
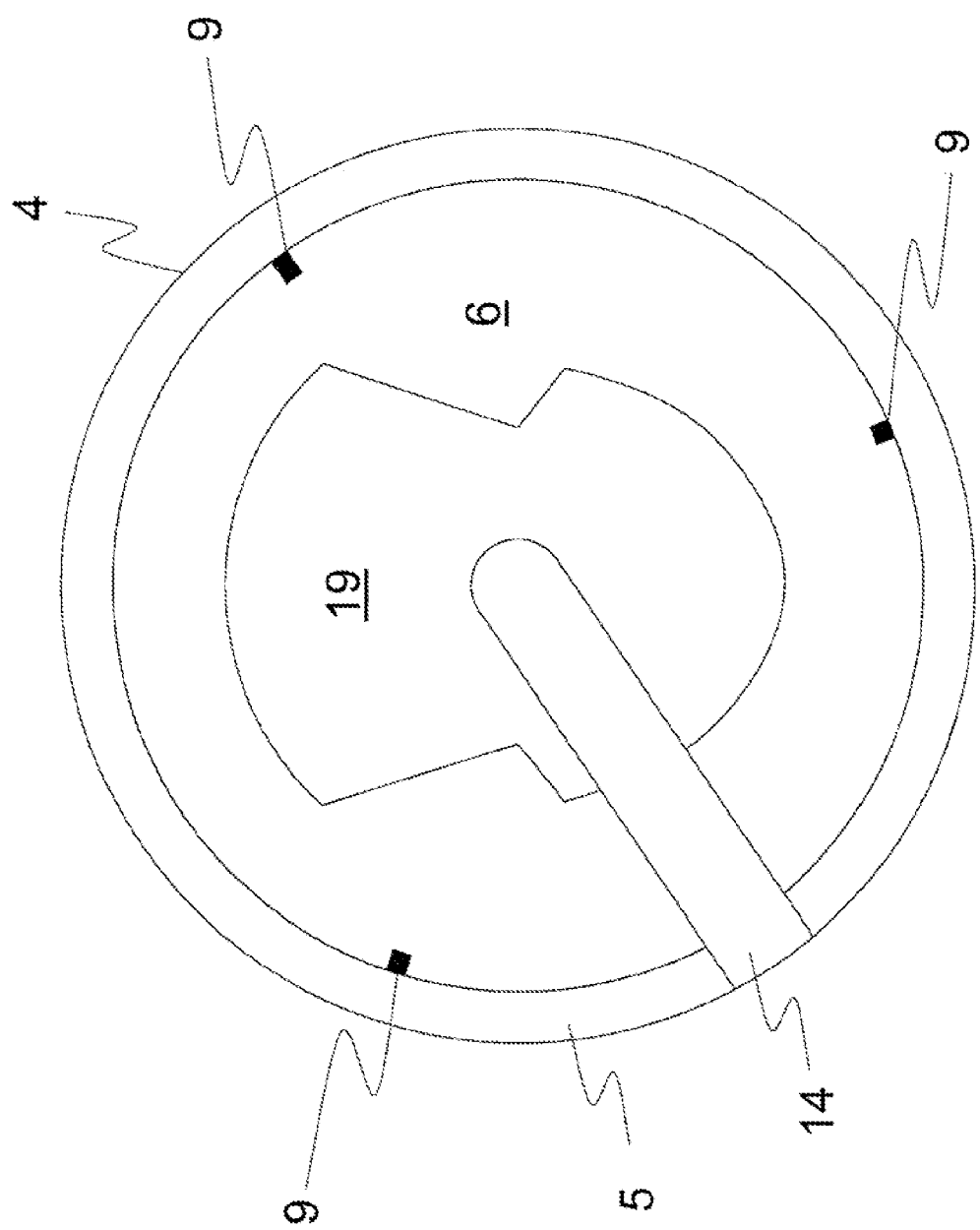

While FIG. 3 shows a cut through the sieve device, the front view according to FIG. 4 also shows that the collection device 17 and the collecting funnel 15 are closed with a front wall 19 in the area of the open front 5 of the filter basket 4, so that no sewage 2 can reach the screw conveyor 11 area or the collection device 17 from the front either, whereby the drive arm 14 should also be sealed to make it impervious to liquid towards the front wall 19.

Figure 5:
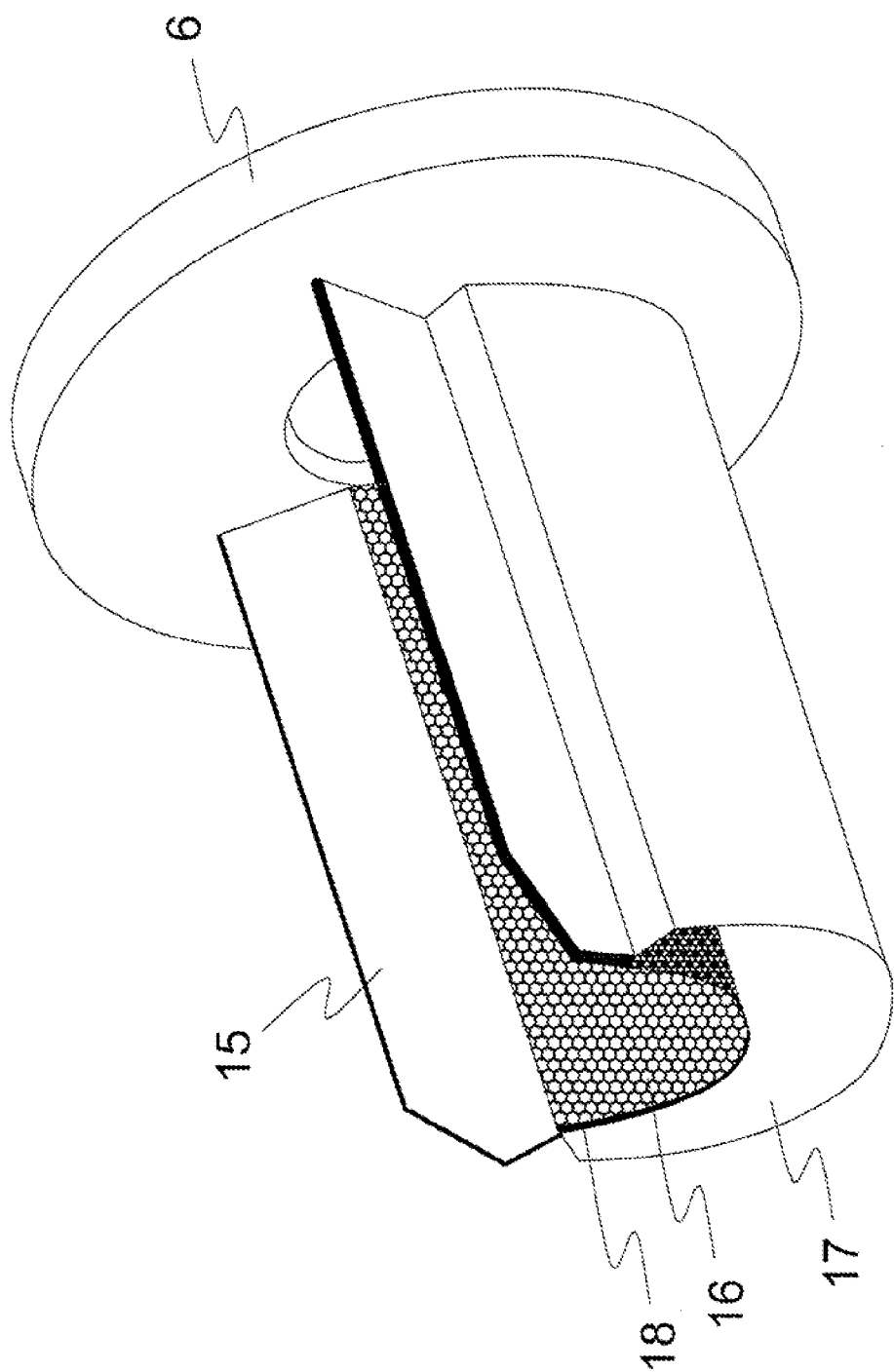
Figure 6:
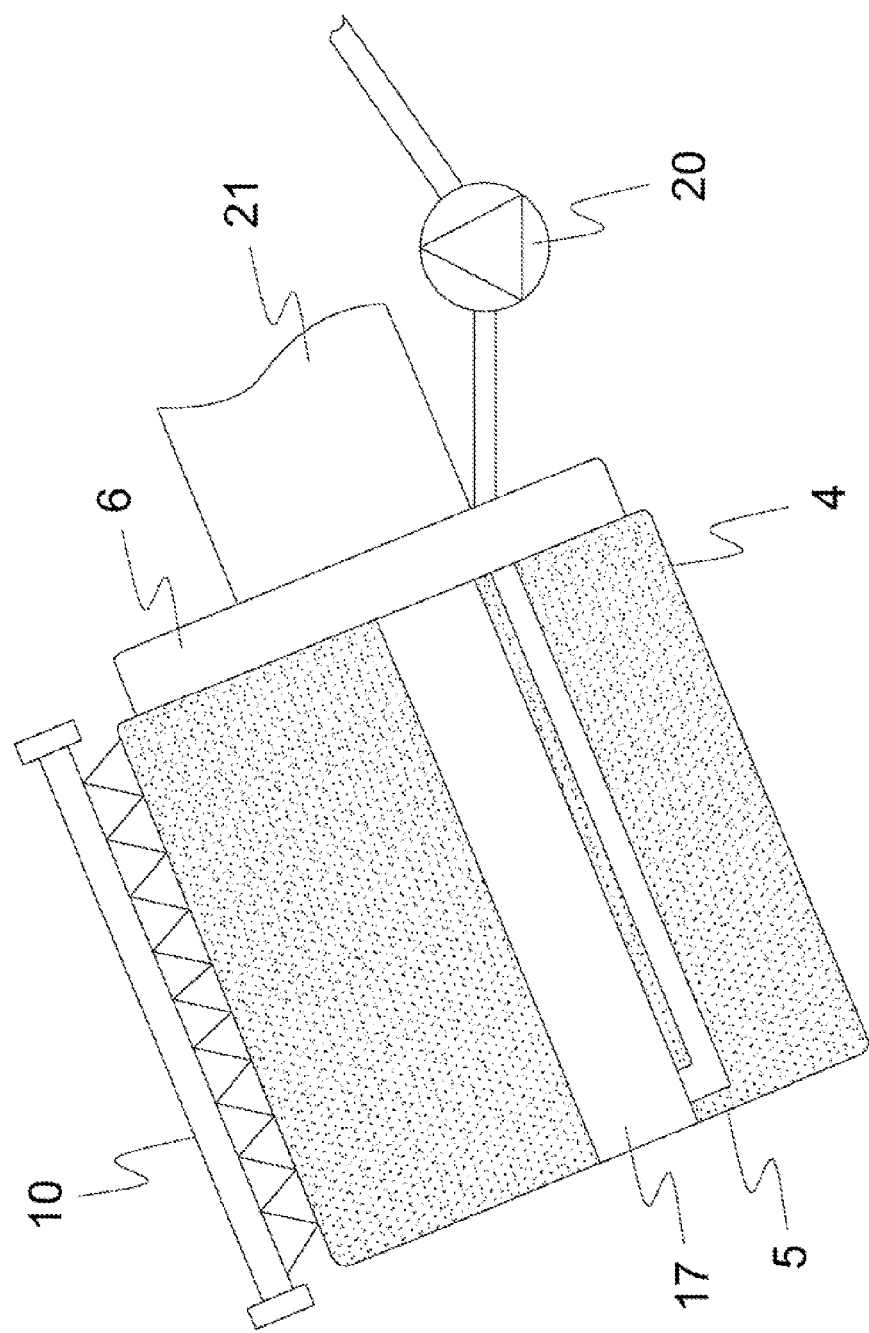

Finally, FIG. 5 shows a perspective view of a filter basket 4 interior of a sieve device according to an embodiment of the invention, in which the front wall 19 and the filter basket 4 itself are withdrawn for a better overview. This view finally shows that the collection device 17 is executed as a trough closed towards the bottom in which a pumping-out pipe (not shown) protrudes from a corresponding pumping-out device 20 (FIG. 6). Alternatively, the pumping-out device 20 itself can also be naturally arranged in the interior of the collection device 17 and connected via an associated piping system, for example with the downstream section of channel 1 of the sieve device.

Apart from the filtering device shown, the collection device 17 according to the invention can also finally be used in other rotating filters, especially drum filters that can be driven around a horizontally arranged rotating axis.

The collection device 17 can also be used with significant advantages in filtration plants that filter out fine floating materials compared with the state of the art. Thus, the collection device 17 used with the pumping-out device 20 (as shown in FIG. 6) serve as replacement for a conventional screw conveyor 11 that most of the time are incapable of withdrawing fine floating substances reliably. For this purpose, a collection device 17 has been placed in the dead center area of the sieve element (drivable with the help of a corresponding drive—not shown—via a driving axis 21) so even the finest floating substances can be removed from the sieve device. The floating substances, which also accumulate in such sieve devices in the rotating inner surface of the sieve element, are in turn removed from the sieve area with the help of a spray nozzle bar 10 and finally reach the collection device 17 (which can be trough-shaped, for example) in the interior of the filter element. The floating material and the spray water finally create a suspension that is suctioned with the help of the pumping-out device 20 for further possible processing. The collection device 17 can in this case have a U or semicircular cross-section and is generally arranged in the area of the rotating axis of the filter basket 4.

Incidentally, the invention is not restricted to the embodiments shown. Rather, all combinations of the described individual characteristics as they are shown or described in the claims, the description and the figures are the object of the invention as far as a corresponding combination seems technically feasible or useful. Thus, needless to say, the pumping-out device (20) according to FIG. 6 can be similarly arranged in the devices, as described in connection with FIGS. 3 to 5.

The invention claimed is:

1. A device for removing floating material from liquid, comprising:
    a sieve element configured as a filter basket having a front side with an inlet opening therein through which liquid to be filtered flows into an interior of said sieve element;
    a drive configured with said sieve element to rotate said sieve element about a rotational axis;
    a collecting funnel arranged within the sieve element;
    a non-rotating collection device with respect to said sieve element, the collection device arranged within said sieve element below said collecting funnel so as to catch and retain liquid and floating material that falls from said collecting funnel as said sieve element rotates, wherein the retained liquid and the floating material creates a suspension within the collection device; and
    a pumping-out device connected to said collection device, the pumping-out device comprising a pump configured to suction and pump out the suspension from within the collection device and through the pump.

2. The device as in claim 1, wherein said collection device comprises an inlet feeding area and side walls extending below said collecting funnel and configured in a liquid-tight manner with an interior of said sieve element except in said inlet feeding area.

3. The device as in claim 2, wherein said collection device comprises a trough-like configuration.

4. The device as in claim 3, further comprising a perforated wall section in said inlet feeding area above said collection device.

5. The device as in claim 4, wherein said perforated wall section is a joint wall of said collecting funnel and said collection device.

6. The device as in claim 5, wherein said perforated wall section has a mesh that is equal to or less than a mesh of said sieve element.

7. The device as in claim 5, wherein at least one of said collection device or said collecting funnel comprise a detachable wall section.

8. The device as in claim 1, wherein said collection device extends essentially over an entire length of said sieve element.

9. The device as in claim 1, further comprising a screw conveyor discharge device arranged at least partially within said sieve element above said collection device.

10. The device as in claim 1, further comprising a drain pipe that extends into said collection device, said pumping-out device located outside of said sieve element and connected to said drain pipe.

11. The device as in claim 10, further comprising a liquid level sensor configured within said collection device, said pumping-out device in communication with said liquid level sensor to operate said pumping-out device upon a certain level of liquid collecting within said collection device.

12. The device as in claim 1, wherein said sieve element and collection device are arranged at an inclined angle relative to a horizontal plane of water that flows through said sieve element for filtering.

13. A process for removing floating material from a liquid, comprising:
    placing a sieve element configured as a filter basket in a flow of the liquid;
    rotating the sieve element about a rotation axis;
    with a collecting funnel and a non-rotating collection device with respect to the sieve element arranged within the sieve element below the collecting funnel, collecting and retaining liquid and floating material that falls from the collecting funnel as the sieve element rotates, wherein the retained liquid and the floating material creates a suspension within the collection device; and
    drawing a suction on the collection device with a pump and suctioning the suspension from within the collection device and through the pump.

14. The process as in claim 13, wherein the liquid and floating material is pumped from the collection device in batches.

15. The process as in claim 14, wherein the liquid and floating material is pumped from the collection device as a function of running time of the sieve element.

16. The process as in claim 14, wherein the liquid and floating material is pumped from the collection device upon a detected liquid level within the collection device sensed by a liquid level sensor.

17. The process as in claim 13, further comprising re-supplying the liquid withdrawn from the collection device back through the sieve element.

18. The process as in claim 13, further comprising directing the liquid withdrawn from the collection device to a permeate exiting the sieve element.

* * * * *